(12) United States Patent
Byrd et al.

(10) Patent No.: US 12,195,668 B2
(45) Date of Patent: Jan. 14, 2025

(54) COUPLING AGENT TO ENHANCED COUPLING OF OPTICAL FIBERS DEPLOYED IN SUBSURFACE WELLS

(71) Applicant: Halliburton Energy Services, Inc., Houston, TX (US)

(72) Inventors: Grayson Dane Byrd, Houston, TX (US); Mikko K. Jaaskelainen, Houston, TX (US); Michel LeBlanc, Houston, TX (US); Philip D. Nguyen, Houston, TX (US); Michael Wayne Sanders, Houston, TX (US); Antonio Recio, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 57 days.

(21) Appl. No.: 18/318,486

(22) Filed: May 16, 2023

(65) Prior Publication Data

US 2024/0384155 A1 Nov. 21, 2024

(51) Int. Cl.
*C09K 8/518* (2006.01)
*C09K 8/508* (2006.01)
*E21B 23/14* (2006.01)

(52) U.S. Cl.
CPC ............ *C09K 8/518* (2013.01); *C09K 8/5083* (2013.01); *C09K 8/5086* (2013.01); *E21B 23/14* (2013.01)

(58) Field of Classification Search
CPC .... C09K 8/518; C09K 8/5083; C09K 8/5086; E21B 23/14
See application file for complete search history.

(56) References Cited

U.S. PATENT DOCUMENTS

| | | |
|---|---|---|
| 5,304,620 A | 4/1994 | Holtmyer et al. |
| 5,439,057 A | 8/1995 | Weaver et al. |
| 5,775,425 A | 7/1998 | Weaver et al. |
| 5,787,986 A | 8/1998 | Weaver et al. |
| 5,813,658 A | 9/1998 | Kaminski et al. |
| 5,833,000 A | 11/1998 | Weaver et al. |
| 5,839,510 A | 11/1998 | Weaver et al. |
| 6,016,870 A | 1/2000 | Dewprashad et al. |
| 6,257,335 B1 | 7/2001 | Nguyen et al. |
| 9,725,639 B2 | 8/2017 | Vo et al. |
| 11,168,543 B2* | 11/2021 | Purkis ................... G02B 6/502 |
| 11,549,369 B1 | 1/2023 | LeBlanc et al. |
| 2005/0194139 A1 | 9/2005 | Hanes et al. |
| 2005/0274517 A1 | 12/2005 | Blauch et al. |
| 2006/0260808 A1 | 11/2006 | Weaver et al. |
| 2008/0281197 A1 | 11/2008 | Wiley et al. |
| 2012/0243881 A1* | 9/2012 | Homa ................. G02B 6/4483 264/1.28 |
| 2014/0262267 A1 | 9/2014 | Fustos et al. |

(Continued)

*Primary Examiner* — Dany E Akakpo
(74) *Attorney, Agent, or Firm* — John Wustenberg; Parker Justiss, P.C.

(57) ABSTRACT

A coupling agent for deployment around an optical fiber in a subsurface wellbore, the coupling agent including a curable or non-curable compound that can form into a reversible polymerized gel state located around at least a portion of the optical fiber and there is a gel-optical fiber interface strain gradient that is greater than a wellbore fluid-optical fiber strain gradient. A method of deploying an optical fiber in a fluid path of a subsurface wellbore and introducing a coupling agent in the fluid path.

20 Claims, 5 Drawing Sheets

(56) References Cited

U.S. PATENT DOCUMENTS

| | | |
|---|---|---|
| 2018/0044577 A1 | 2/2018 | Nguyen et al. |
| 2020/0291772 A1 | 9/2020 | Thiruvenkatanathan et al. |
| 2021/0131276 A1 | 5/2021 | LeBlanc et al. |

\* cited by examiner

COUPLING AGENT TO ENHANCED COUPLING OF OPTICAL FIBERS DEPLOYED IN SUBSURFACE WELLS

TECHNICAL FIELD

This application is directed, in general, to fluids and methods to enhance the coupling of an optical fiber to the wall of a subsurface well.

BACKGROUND

Optical fibers, such as disposable optical fibers ('fibers'), are often deployed in well bores to facilitate sensing operations, such as distributed sensing operations including distributed temperature sensing (DTS), distributed pressure sensing (DPS) and distributed acoustic sensing (DAS) as well as data communication to and from a wellbore. However, poor coupling between the fiber and the wellbore wall can result in less accurate information being collected or data interpretation problems, e.g., due to movement of the fiber or fluid movement during measurements. Past efforts to reduce such movement include coupling the fiber to the wellbore wall by providing an outer layer or coating that includes a viscous fluid, gel or colloid fluid.

BRIEF DESCRIPTION

Figure 1:
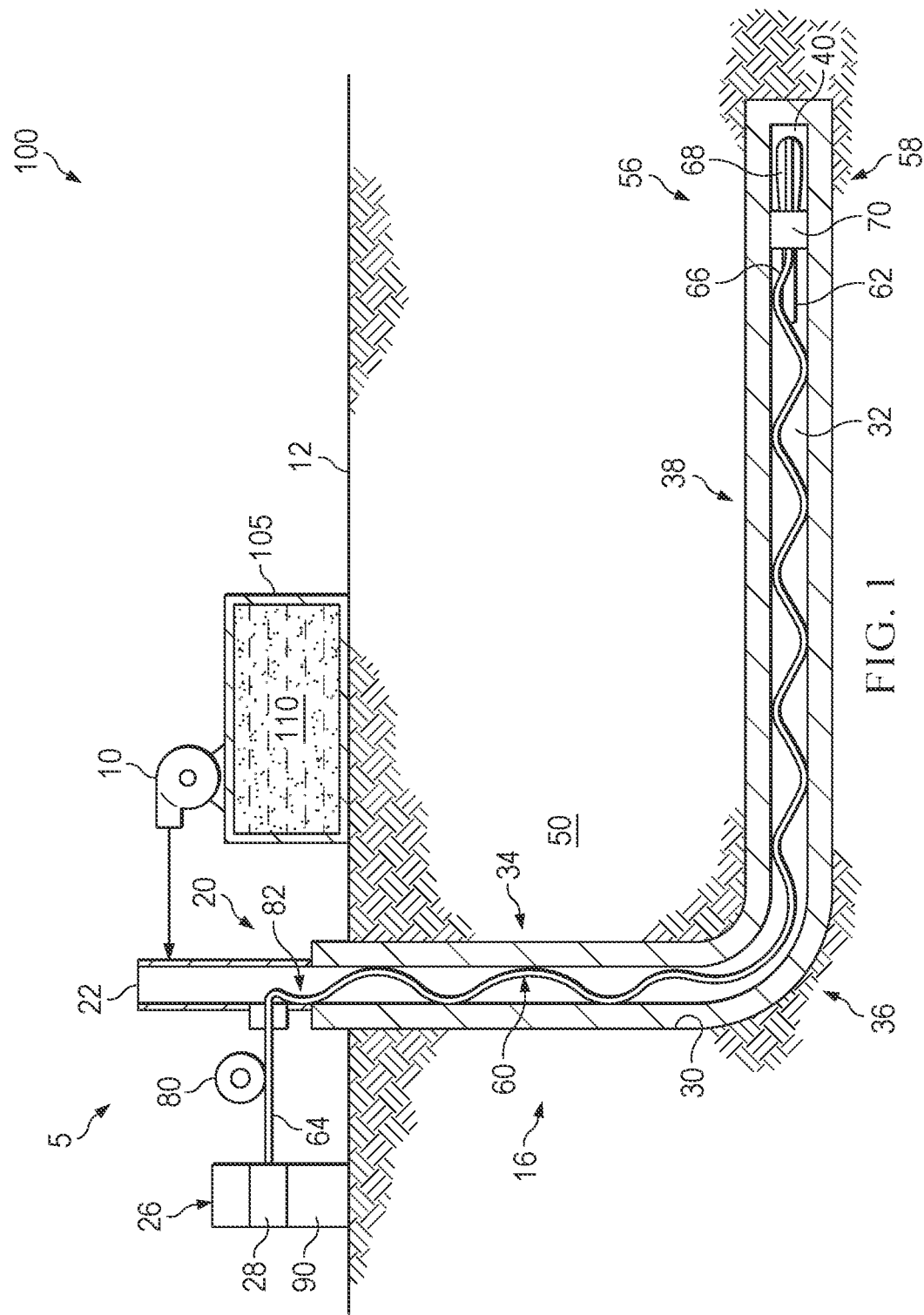
Figure 2:
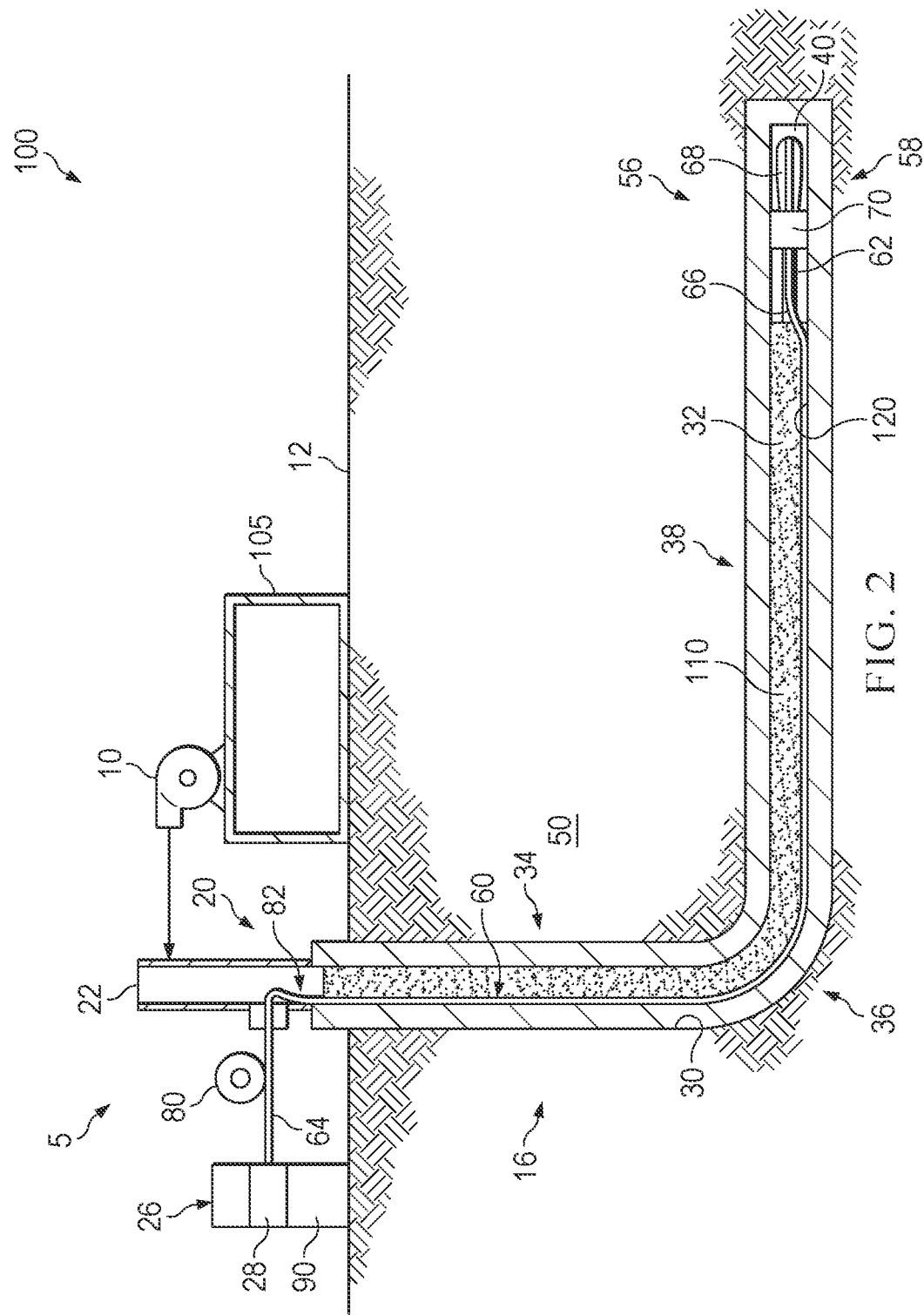
Figure 3:
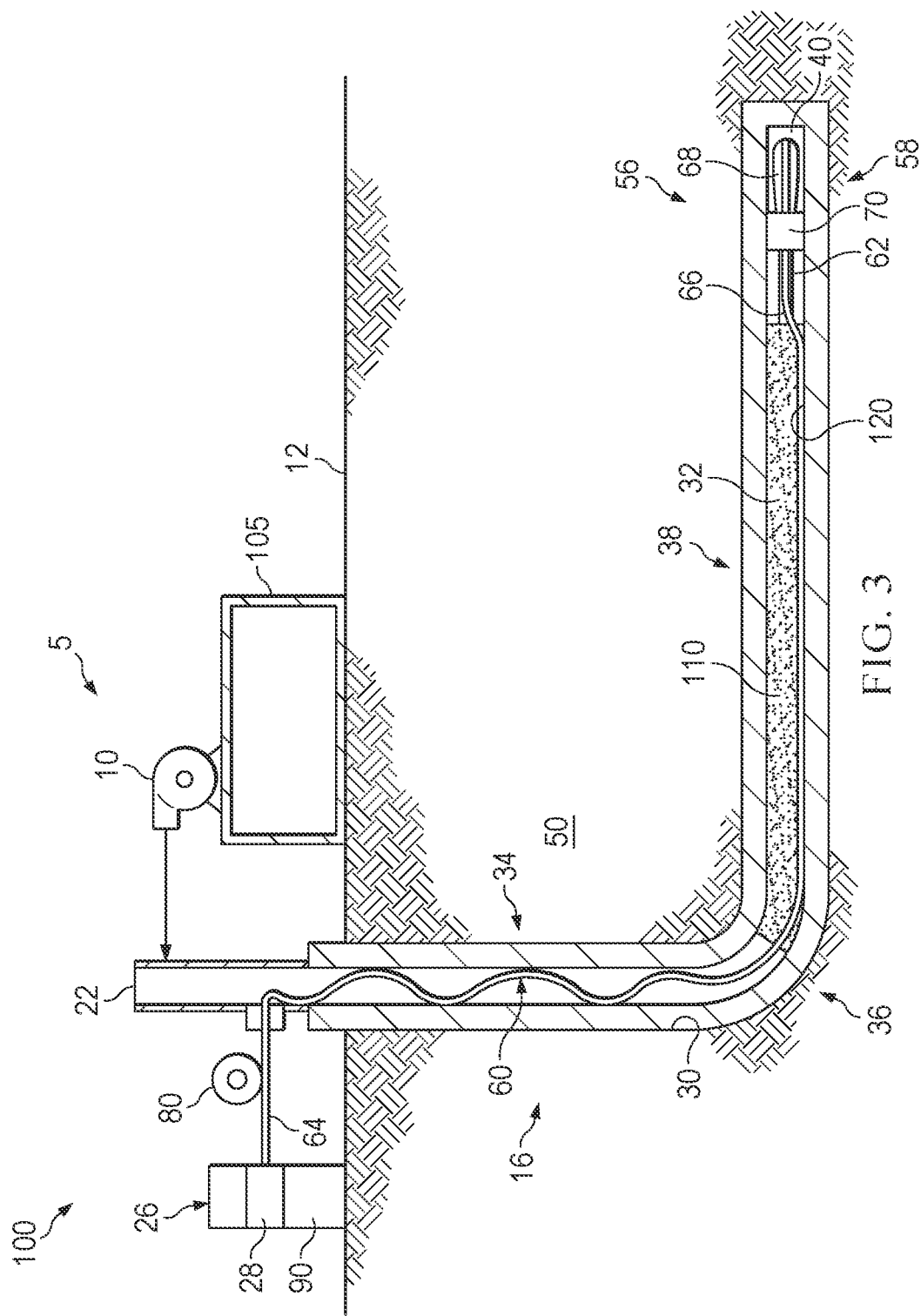
Figure 4:
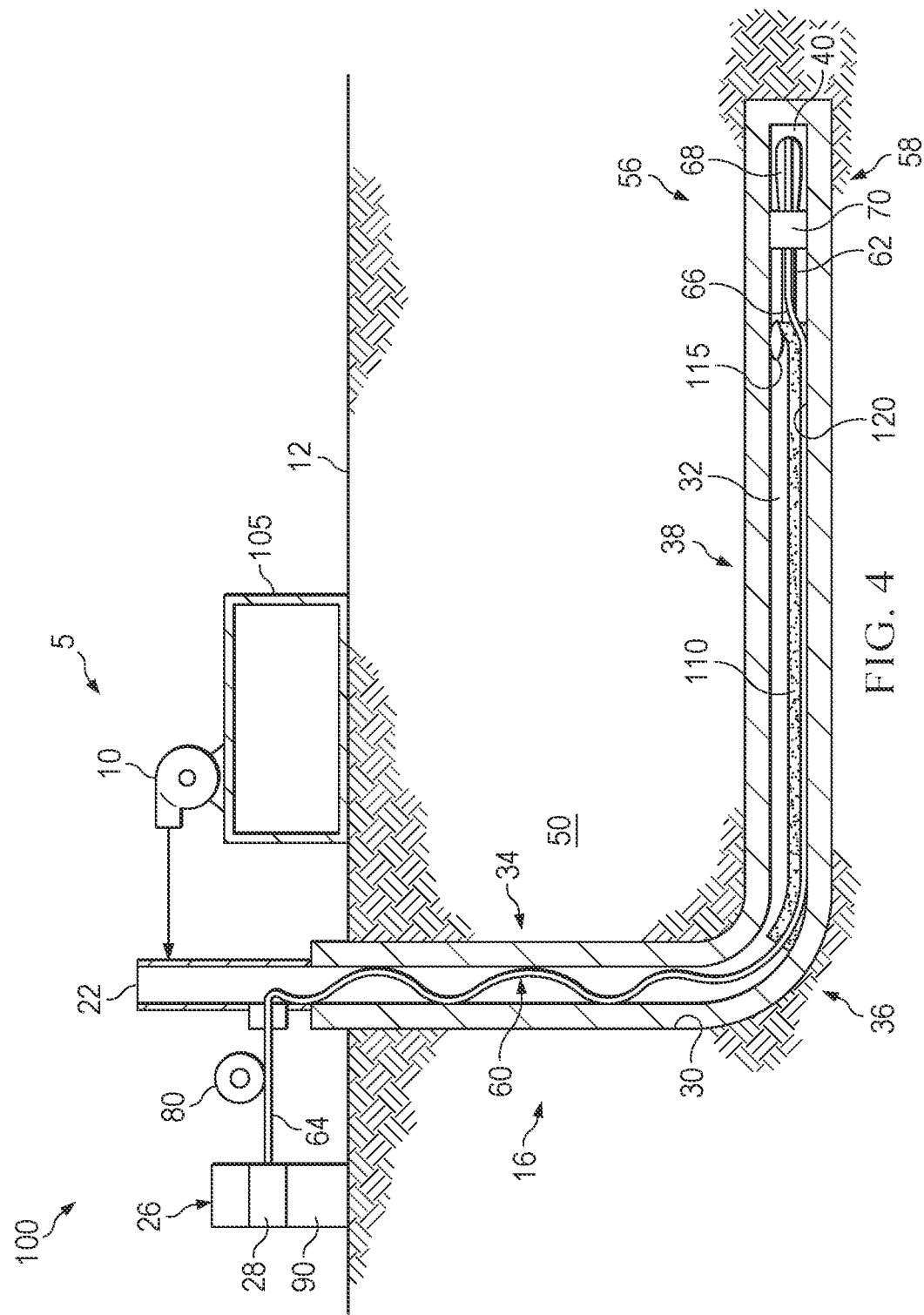
Figure 5:
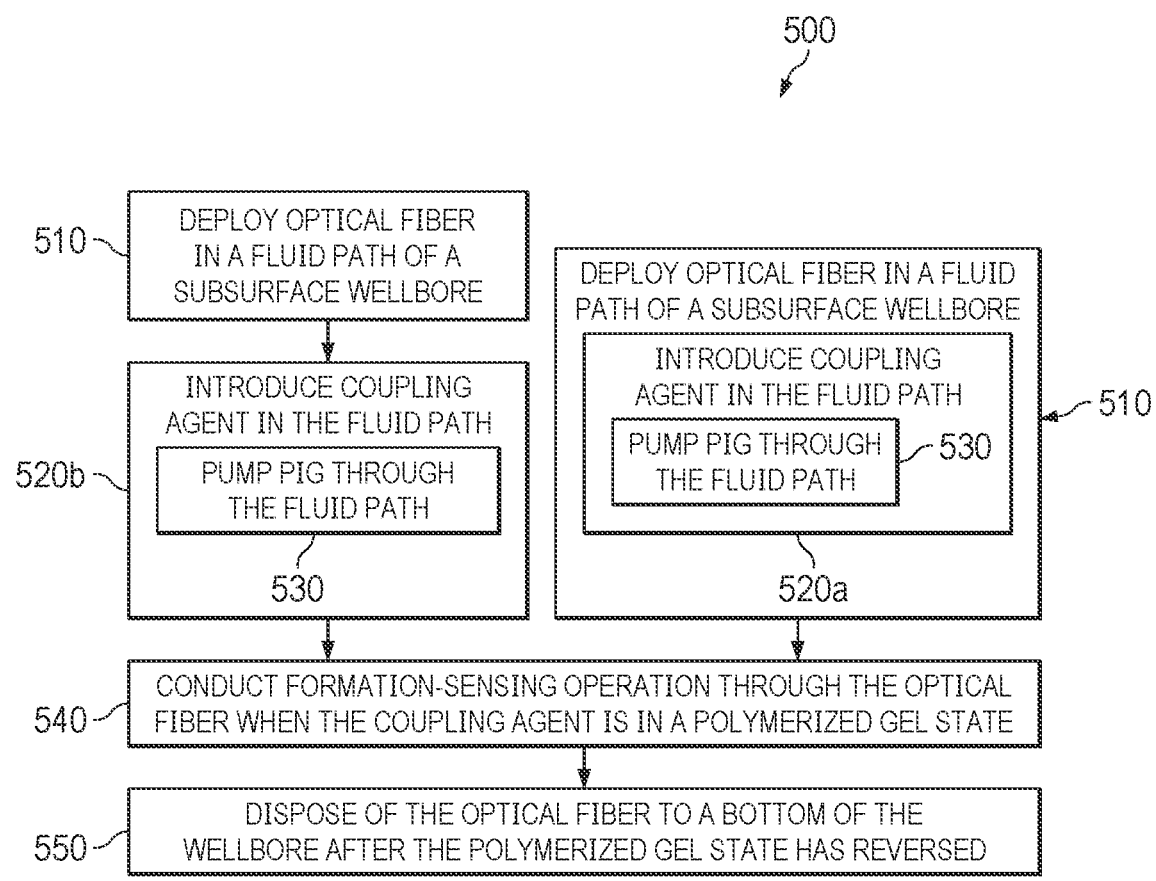

Reference is now made to the following descriptions taken in conjunction with the accompanying drawings, in which:

FIG. 1 presents a schematic view of an embodiment of a wellbore drilling system including a formation testing apparatus disposed in a subsurface wellbore and illustrates an example system for drilling operations that includes a coupling agent prior to being introduced around a fiber of the formation testing apparatus in accordance with embodiments of the present disclosure;

FIG. 2 presents a schematic view of the wellbore drilling system shown in FIG. 1, after the coupling agent is introduced around the fiber of the formation testing apparatus in accordance with embodiments of the present disclosure;

FIG. 3 presents a schematic view of the wellbore drilling system analogous to that shown in FIG. 2, after the coupling agent is introduced around the fiber in a horizontal portion of the wellbore in accordance with embodiments of the present disclosure;

FIG. 4 presents a schematic view of the wellbore drilling system analogous to that shown in FIG. 3, after the coupling agent is introduced around the fiber in a horizontal portion of the wellbore but does not entirely fill the horizontal portion in accordance with embodiments of the present disclosure; and FIG. 5 presents a flow diagram of an example method that includes introducing a coupling agent around a fiber deployed in a borehole of a subsurface well site in accordance with the present disclosure.

DETAILED DESCRIPTION

As part of the present disclosure, we recognize that past efforts to increase coupling are insufficient in that fibers disposed in wellbores tend to move, e.g., fiber slippage when there is formation movement close to the wellbore. Our idea is to provide a coupling agent that is capable of cross-linking to form a gel state around at least a portion of the fiber disposed in the wellbore, e.g., corresponding to a targeted portion of the wellbore from which measurements about the formation will be obtained.

We further recognized the desirability to engineer the coupling agent such that the cross-links of the gel are reversible so that, e.g., once the measurements from the fiber are collected for the targeted portion of the wellbore, the fiber can be uncoupled from the wall of the wellbore due to the gel transforming back to a fluid state. This facilitates the fiber being deployed to a different portion of the well bore and recoupled to the wall for further measurements, or, a for different portion of the fiber to be coupled to the wall corresponding the different portion of the well bore for further measurements, or, the fiber can be disposed of in the bottom of the wellbore.

As further disclosed herein an important guiding principle to the selection of a suitable coupling agent, is for the chemical compounds that comprise the fluid to be reversible crossed-linked to thereby form a gel to provides a suitable strain transfer reduction to the fiber, e.g., to reduce fiber slippage when a strain event from the formation approaches the wellbore. In particular, as part of this disclosure, we recognized that having a reversible crossed-linked gel that provides a certain minimal interfacial shear, e.g., that is higher than a frictional shear transfer value, can reduce strain transfer to the fiber by increasing the gradient of interfacial shear at the fluid/fiber interface.

As non-limiting examples, consider a formation where frictional shear transfer from wellbore fluids (which can include formation fluids) provides a strain gradient of 60 microstrain per km ($\mu\varepsilon$/km) to a fiber. For a gradient sustained by interfacial shear at the fluid/fiber interface, the relation between axial strain gradient ($d\varepsilon_z/dz$) and interfacial shear ($\tau_i$) is modeled as follows:

$$\frac{d\varepsilon_z}{dz} = \frac{2}{r_o \cdot E_{eff}} \cdot \tau_i$$

where $r_c$ is the radius of the fiber, and $E_{eff}$ is the effective (average) Young's modulus of the fiber.

Assuming a fiber (e.g., an acrylate-coated fiber) where $r_c$=121 $\mu$m and $E_{eff}$=19 GPa, means that a shear greater than 0.064 Pa will provide better coupling than by friction alone. That is, for such a fiber, providing a cross-linked coupling agent that gels to have an interfacial shear of greater than 0.064 (e.g., 0.11, 0.21, 0.63, 1.06, 10.6, 106.6, 1066.6, or 10,666.6 Pa) can result in a gel-fiber interface strain gradient of greater than 60 $\mu\varepsilon$/km (e.g., 100, 200, 500, 1,000, 10,000, 100,000, 1.0000,000 or 10.000,000$\mu\varepsilon$/km, respectively) corresponding to, e.g., at least 166, 333, 833, 1,666, 16,666, 166,666, 1,666,666 or 16,666,666 percent greater than a formation fluid fiber interface strain gradient. Based on the present disclosure one skilled in the pertinent arts would understand how the selection of a suitable coupling agent would be guided to provide a cross-linked gel with a suitable interfacial shear value for other fiber embodiments, e.g., with different $r_c$ and $E_{eff}$ values.

As further disclosed herein, another important guiding principle to the selection of a suitable coupling agent is to select chemical compounds that reversibly gels (e.g., cross-links in some embodiments) in a suitable timeframe to flow around the fiber, to form a gel state that mechanically holds the fiber to wellbore wall casing and then de-gels (e.g., de-crosslinkers in some embodiments). That is, the selected chemical compounds disclosed herein do not form irreversible chemical bonds to either the fiber, the casing or any parts of the wellbore string or tools carried by the string. Rather, the gel, by mechanically surrounding a portion of the fiber, increases the drag of formation fluids flowing around the gel such that the flow next to the gel is nearly zero, effectively increasing the dynamic viscosity of formation fluids surrounding the gel such that the portion of the fiber is held in place.

As further disclosed herein, the gels formed by the chemical compounds of the coupling agents can be delayed or delinked, either spontaneously in the wellbore environment, and/or, with the aid of a gel delaying agents (e.g., decrosslinker agent in some embodiments) added to the coupling agent, to thereby delay crossing linked or revert the gel to a free-flowing fluid state (e.g., having a viscosity close to that of water), respectively, in the wellbore. For instance, heat in the wellbore environment in the vicinity of the gel can spontaneously breakdown the gel to a fluid state. Or, delinking agents, such as enzymes, oxidizers or acids, as further disclosed herein, can be added to coupling agent to facilitate the breakdown of the gel to a fluid state.

Based on the present disclosure, one skilled in the pertinent art would appreciate how the coupling agent could be engineered, or selected, to adjust the timing of three sequential time periods: a first period where a free-flowing coupling agent flows around at least a target portion of the fiber; second period when the coupling agent forms into a crosslinked or polymerized gel state located around at least a portion of the optical fiber, during which time measurements are taken and transmitted through the fiber; and then a third period when the gel breaks down to revert to a free-flowing fluid.

FIG. 1 presents a schematic view of an embodiment of a wellbore drilling system 100 including a formation testing apparatus 5 disposed in a subsurface well 16 and illustrates aspects of the system that includes a coupling agent 110 to be introduced around a fiber 60 of the formation testing apparatus 5 in accordance with embodiments of the present disclosure.

The well 16 can be an observation or treatment well communicating one or more fluids to or from a subterranean formation 50. E.g., the well 16 can be an observation well proximate to the treatment well and have various tools inserted in a wellbore 30 for acoustically detecting, e.g., the fluid flow, in nearby treatment wells (not depicted). E.g., the well 16 can be the treatment well itself with the various tools inserted in a wellbore 30 for acoustically detecting.

A surface 12 can have equipment thereon for monitoring the well 16, such as one or more fluid displacement devices 10, such as pumps 10. The pump 10 can be fixed on the ground at the surface 12 or can be transportable by being supported by a vehicle, such as a truck and trailer.

A fiber (e.g., optical fiber or waveguide) 60 can be deployed in a wellbore 30 of the well 16. The wellbore 30 can surround a fluid path 32 (e.g., in some embodiments, a pre-production fluid path prior to introducing perforation into the wellbore and fractures in the formation) and have a heel 36 and a toe 40 in a subterranean formation 50, such as a subterranean fluid producing formation 50. Fluid injected in a well may exit the well bore into the formation through perforations, an open sleeve, valve or other fluid communication channels (not shown) in toe 40 during fiber deployment or well operations. A fiber conveyor or dispensing tool 58 can include the fiber 60 wrapped around a spool 62 coupled to a dart 68 optionally with one or more swell cups 70. The fiber conveyor 58 may initially be placed at the wellhead 20 below or above wellhead piping 22. E.g., a disposable fiber conveyor or dispensing tool may be deployed from above the fluid injection point and the fiber connections are commonly at the top of the assembly that would sit on top of piping 22. An uphole end 64 of the fiber 60 can be initially uncoupled to an instrument 28, such as an interrogator 28, of an instrument panel 26. The interrogator 28 can direct light into the fiber 60 once connected. The Halliburton ExpressFiber™ disposable fiber deployment product and service is a non-limiting example.

A fluid displacement device 10 can be at the surface 12. The fluid displacement device 10 may be a pump 10, such as an electric pump 10, with a variable frequency drive controlling a deployment (speed) between a minimum and a maximum velocity to regulate acceleration between minimum and maximum limits. E.g., any pump with suitable rate control may be used including but not limited to diesel, natural gas, hydrogen or any other hydrocarbon driven pumps. The fiber 60 may include a second inventory 80 of the fiber 60 near the uphole end 64. where the second inventory 80 may be inside the wellbore 30 or on the surface outside the wellbore 30. The wellbore 30 can form the fluid path 32 having a substantially vertical portion 34 being a first location 34 and a substantially horizontal portion 38 or a second location 38. The substantially vertical portion 34 can form the heel 36 transitioning to the substantially horizontal portion 38 terminating at the toe 40 or a third location 40. The fiber conveyor 58 can be at a first spooled position near the wellhead 20 at the surface 12 and location 34 and then subsequently. the fiber conveyor positioned at a second deployed position at the toe 40 at location 40, as depicted in FIG. 1. In other words, the dart 68 can be positioned near the wellhead 20 at location 34, the second location 38, or the third location 40 in the fluid path 32 moving from the wellhead 20 to the toc 40.

In some embodiments, the fiber conveyor 58 can deploy in the substantially vertical portion 34 with the dart 68 having sufficient weight to aid the deployment by dropping via gravity. During or following the deployment of the fiber 60, the fluid displacement device 10 can pump down fluid, such as water, from a reservoir 105 that includes the coupling agent 110 in a fluid state. The fiber 60 can deploy from the spool 62 from the back of the fiber conveyor 58. After reaching the heel 36, the fluid displacement device 10 can pump fluid, such as water, down the wellbore 30 to propel the fiber 60 through the substantially horizontal portion 38 to the toc 40. The swell cups 70 can swell acting as, e.g., a "sail", aiding the thrust of the fiber conveyor 58 in the substantially horizontal portion 38. After the fiber conveyor 58 reaches the toe 40, the fiber 60 can be connected to the instrument 28 at the uphole end 64 and extend to the toe 40 at the downhole end 66. If excessive tension exists in the fiber 60, the second inventory 80 of fiber 60 can be released creating slack 82. This release of slack 82 can be regulated by a processor communicating with a controller as familiar to those skilled in the pertinent art.

The formation testing apparatus 5 can include a waveguide-based distributed sensing module 90 to record signals, such as acoustic signals, generated by fluid flow associated with the presence of hydrocarbon reservoirs. The module can include any or all of DTS, DPS and DAS systems. In some embodiments, a DAS system of the module 90 may be coupled to the fiber 60 comprising a plurality of receiving sensors (e.g., acoustic and/or seismic sensors) such as fiber-optic sensors, geophones, optical hydrophones, accelerometers, fiber-optic interferometric sensors, and/or like to measure the acoustic data and the seismic data.

The fiber optic cables may house one or several optical fibers and the optical fibers may be single mode fibers, multimode fibers or a combination of single mode and multimode optical fibers. Other types of fiber-optic sensors may include point sensors either at the surface and/or downhole. Single point or multi-point pressure and temperature sensors may be used in reservoir monitoring applications, where the pressure sensors may be capable of collecting data at rates up to about 2,000 hertz (Hz) or even higher.

FIG. 2 presents a schematic view of the wellbore drilling system 100 shown in FIG. 1. after the coupling agent 110 is introduced around the fiber 60. FIG. 3 presents a schematic view of the wellbore drilling system 100 analogous to that shown in FIG. 2, after the coupling agent 110 is introduced around the fiber 60 in a horizontal portion 300 of a fluid path 32 of the wellbore 30 (e.g., between the heel 36 and the toe 40) in accordance with embodiments of the present disclosure. FIG. 4 presents a schematic view of the wellbore drilling system 100 analogous to that shown in FIG. 3, after the coupling agent 110 is introduced around the fiber 60 in the horizontal portion 300 of the wellbore 30, but, the coupling agent 110 does not entirely fill the horizontal portion, in accordance with embodiments of the present disclosure;

With continuing reference to FIGS. 1-4 throughout, one embodiment of the disclosure is a coupling agent 110 for deployment around an optical fiber 60 in a subsurface wellbore 30.

The coupling agent 110 includes a curable or non-curable compound that can form into a reversible polymerized gel state located around at least a portion of the optical fiber 60 and there is a gel-optical fiber interface strain gradient that is greater than a wellbore fluid-optical fiber strain gradient.

For instance, in some embodiments, the gel-optical fiber interface strain gradient is at least 166 percent greater than the wellbore fluid-optical fiber strain gradient.

Embodiments, of coupling agent 110 can be or include any of the curable or non-curable compounds disclosed herein, e.g.: non-curable polyacrylates; non-curable polyamides; curable polymetric resins including epoxy resin and further including one or more of a solvent, a hardening agent, a coupling agent, or a wetting agents; non-curable a polymerizable organic monomers including delinking agents; non-curable gelling agents; non-curable fluid loss control agents; or non-curable foamable compounds.

In some embodiments, the coupling agent 110 is part of a formation testing apparatus 5. Embodiments of the formation testing apparatus 5 can include the optical fiber 60 and a fiber conveyor 58. Embodiments of the formation testing apparatus 5 can include one or more of a fluid displacement device 10, the reservoir 105 that includes the coupling agent 110 or the waveguide-based distributed sensing module 90. In some such embodiments, the optical fiber 60 and the fiber conveyor 58 are disposable.

In some embodiments, as illustrated in FIG. 2, the polymerized gel state of the coupling agent 110 could be formed in the entire fluid path 32 of the wellbore 30. In other embodiments, as illustrated in FIGS. 3 and 4, the gel could be formed only in the horizontal portion 38 of the fluid path 32. In still other embodiments, the gel could be formed in the vertical portion 34 or diagonal portions 36 of the well.

In some embodiment the gel can occupy an entire length of the lateral or vertical portions 34, 38, while in other embodiments shorter lengths of these portions 34, 38 could occupied by the gel, e.g., a length sufficient to hold the target portion of the fiber in place to allow data measurement and collection and not an excess length such that it would take longer than desired to de-link the coupling agent back to a fluid state once the measurement and collection are completed.

In some embodiments, such as illustrated in FIGS. 2 and 3, the gel form of the coupling agent 110 entirely fills the radial section of the fluid path 32 of the wellbore 30, e.g., so that fluid flow through the portion of the wellbore occupied by the gel gets completely blocked.

In other embodiments, such as illustrated in FIG. 4, the radial section of the wellbore occupied by the gel around the fiber is not completely blocked by the gel.

Pigs, as familiar to those skilled in the art, are typically used an inspection, clearing or cleaning devices as it is pumped through a pipeline under pressure. As part of the present disclosure, we realized that as the fiber and coupling agent 110 are dispensed out the back of the fiber conveyor 58, a pig 115 (FIG. 4) can run through coupling agent in its fluid state and help coat the fiber 60 with the coupling agent to help position the coupling agent around the fiber and adhere the coupling agent and fiber to the wellbore wall 120.

To help avoid having the pig break or abrade the fiber, the pig can be constructed of a pliable rubber and/or foam material. Non-limiting examples include pigs composed of a pliable crosslinked hydroxyethylcellulose (HEC) or other fluid loss control agents whose viscosity and stiffness can be adjusted as need to avoid damaging the fiber, e.g., products such as K-MAX™ or MAX-SEAL™ as further disclosed herein.

Another embodiment of the disclosure is a method. With continuing reference to FIGS. 1-5 throughout, the method 500 includes a step 510 of deploying an optical fiber 60 in a fluid path 32 of a subsurface wellbore 30 and a step 520 of introducing a coupling agent in the fluid path 32.

Ways to deploy optical fiber 60 according to step 510 include wireline retrievable, tubing permanent or casing permanent deployment in wells. Permanently installed sensors may include optical fiber cables cemented in place in the annular space between the casing and formation. The optical fiber cables may be clamped to the outside of the casing during the deployment, and protected by centralizers and cross coupling clamps during Run-In-Hole (RIH). Other applications include tubing conveyed cables or retrievable sensing cables like wireline and slickline, or cables deployed inside coiled tubing. Optical fiber cables may also be deployed in wells using gravity where a weight or conveyance vehicle is dropped into a wellbore and fiber is released in the well as deployment vehicle moves down the wellbore. The optical fiber may be payed out from the surface or from a coil in the deployment vehicle. Gravity based deployment vehicles exist, and may be pumped into horizontal well bores in some instances.

As illustrated in FIG. 5 in some embodiments, the coupling agent can be introduced (step 520a, right-hand-side) during deploying (step 510) of the optical fiber, while in other embodiments, the coupling agent can be introduced (step 520b, left-hand-side) after the deploying (step 510) of the optical fiber.

The coupling agent can be or include any of the disclosed curable or non-curable compounds that can form into a reversible polymerized gel state, located around at least a portion of the optical fiber and providing the gel-optical fiber interface strain gradient that is greater than the wellbore fluid-optical fiber strain gradient.

In some embodiments, introducing the coupling agent (step 520a or 520b) can include a step 530 of pumping a pig 115 through the fluid path 32 during or after the introducing of the coupling agent. For instance, in some embodiments, as part of introducing of the coupling agent (step 520), the pig 115 can be pumped behind the fiber conveyor 58 (e.g., directly behind in some embodiments) and thereby travel down fluid path 32 behind the fiber conveyor 58. Alternatively, after dispensing the fiber 60 and the coupling agent 110 down the wellbore, the pig 115 can be pumped downhole to wipe clear the fluid path 32 and thereby push the fiber 60 and coupling agent 110 together against wellbore wall 120.

As further illustrated in FIG. 5 the method 500 can include a step 540 of conducting a formation-sensing operation through the optical fiber 60 when the coupling agent is in the polymerized gel state.

In some embodiments, the method 500 can include a step 550 of disposing of the optical fiber to a bottom of the wellbore after the polymerized gel state of the coupling agent has reversed. For instance, once data collection is done, and the polymerized gel state reversed, the fiber conveyor 58 and fiber 60 can be released and thrown into the bottom of the well and not recovered for further processing. In some embodiments, step 550 may include pumping a pig or a wiper plug down the well bore using a selected fluid or brine once the data collection is done and the polymerized gel state is reversed where the objective is to clean the wellbore and prepare for other well operations like e.g. running of perforation guns as part of a fracturing operation or running other logging tools.

As noted herein, the coupling agent is a curable or non-curable compound that can form into a polymerized gel state which can then be reversed (e.g., degelled or re-liquefied) into a liquid state.

The coupling agent can include any of the compounds disclosed in U.S. Pat. Nos. 9,725,639, 5,787,986, 2005/0274517, 2006/0260808, 5,839,510, 6,016,870, 6,257,335, 5,304,620, 5,439,057 all of which are incorporated by reference herein in their entirety.

For instance, the coupling agent can be or include polyimides and other nitrogen-containing polymers for use in coatings as disclosed in U.S. Pat. No. 9,725,639.

For instance, the coupling agent can be or include polyamide based tackifying compounds which are non-curable agent which hardenable into a gel, such as disclosed in U.S. Pat. No. 5,787,986. The agent can comprise polyamides which are liquids or in solvent solution at the temperature of the subterranean formation to be treated such that polyamides are, by themselves, non-hardening or a product that is a condensation reaction product comprising commercially available polyacids and polyamines. Polyamides can be synthesized through a polycondensation process that entails the combination of polyacids predominately having two or more acid functionalities per molecule with a polyamine. The tackifying compounds can include polyacids such as C36 dibasic acids containing some trimer and higher oligomers and also small amounts of monomer acid which are reacted with polyamines. Other polyacids can include trimer acids, synthetic acids produced from fatty acids, maleic anhydride and acrylic acid and the like. The polyamines, such as disclosed in U.S. Pat. No. 5,787,986, can comprise, for example: ethylenediamine, diethylenetriamine, triethylene tetraamine, tetraethylene pentaamine, aminoethyl piperazine and the like.

Any such tackifying agent can be deployed via: aqueous conventional fracturing fluid, an aqueous foam fluid, a hydrocarbon fluid, an emulsion and/or a viscosifying agent, e.g., at operational temperature of ambient to 275° F.

For instance, the coupling agent can be or include tackifying compounds comprising polyacrylates, as disclosed in 2005/0274517 and 2006/0260808.

For instance, the coupling agent can be or include tackifying compounds comprising polyamide with resin, as disclosed in U.S. Pat. No. 5,839,510. The polyamides may be contacted with a material that has multifunctional reactive sites, or a hardenable resin which are capable of reacting with the tackifying compound to form a material that hardens which results in a substantially non-flowable reaction product. The multifunctional reactive sites can include: aldehydes (formaldehyde, dialdehydes, glutaraldehyde, hemiacetals, aldehyde releasing compounds, diacid halides, dihalides (dichlorides, dibromides), and/or polyacid anhydride (citric acid, epoxide). Furfuraldehyde, gluteraldehdye, aldehyde condensates, and the like. The hardenable resins can include: epoxy or phenolic resin that is capable of curing to achieve a higher degree of polymerization. Examples include phenol-aldehyde resins, melamine-aldehyde resins, epoxy resins, furfuryl alcohol resins and the like.

For instance, the coupling agent can be or include a curable reactive resin, as disclosed in U.S. Pat. No. 6,016,870. For instance, the coupling agent can include a polymeric resins such as an epoxy resin composition selected from the group of liquid hardenable resins consisting of: bisphenol A-epichlorohydrin resin, polyepoxide resin, novolak resin, polyester resin, glycidyl ethers, or combinations thereof. The epoxy resin composition can be 5 to 45 weight percent of the coupling agent.

The curable reactive resin can be a hardenable low viscosity epoxy resin compositions and the curing process can be attenuated to formation temperature, consist of a base polymeric resin, a solvent or diluent, a hardening agent, a coupling agent, and a wetting agent (surfactant).

The hardening agent can includes a liquid hardening agent selected from the group of: amines, aromatic amines, aliphatic amines, cyclo-aliphatic amines, piperidine, triethylamine, benzyldimethylamine, N,N-dimethylaminopyridine, 2-(N2N-dimethylaminomethyl) phenol, tris(dimethylaminomethyl) phenol, or combinations thereof. In some embodiments, the liquid hardening agent is 5 to 45 weight percent of the coupling agent.

The diluent can be selected from the group of: methanol, ethanol, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, or combinations thereof. In some embodiments, the diluent is 10 to 85 weight percent of the coupling agent.

Some embodiments the coupling agent of the resin composition further includes a silane coupling agent selected from the group of: N-2-(aminoethyl)-3-aminopropyltrimethoxysilane, 3-glycidoxypropyltrimethoxysilane, n-beta-(aminoethyl)-gamma-aminopropyl trimethoxysilane or combinations thereof. In some such embodiments, the silane coupling agent is 0.5 to 5 weight percent of the coupling agent.

Some embodiments the wetting agent of the resin composition further includes a surfactant selected from the group of: ethoxylated nonyl phenol phosphate ester, mixtures of one or more cationic surfactants, a C12-C22 alkyl phosphonate surfactant, a mixture of one or more non-ionic surfactants and an alkyl phosphonate surfactant, or combinations thereof Some embodiments of the coupling agent further include a delinking agent selected from the group of enzymes selected from the group of: hemicellulase, β-Mannanase, pectinase, xanthanase or combinations thereof.

Some embodiments of the coupling agent includes a delinking agent selected from the group of oxidizers selected from the group of: sodium persulfate, potassium persulfate, ammonium persulfate, lithium and/or sodium hypochlorites, chlorites, sodium perborate, sodium percarbonate, calcium percarbonate, urea-hydrogen peroxide, hydrogen peroxide, bromates, periodates, permanganates or combinations thereof.

Some embodiments of the coupling agent further includes a delinking agent selected from the group of citric acid, formic acid or combinations thereof Other suitable base polymeric resins (0.5 to 80 wt % of composition) include, but not limited to: an epoxy novalac resin, phenol-aldehyde resins, melamine-aldehyde resins, epoxy resins, furfuryl alcohol resins, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin and hybrids and copolymers thereof, a polyurethane resin and hybrids and copolymers thereof, an acrylate resin, a polyamide resin, and any combination thereof.

Other suitable solvents or diluents (25 to 150 wt % of composition) include, but not limited to: n-methyl-2-pyrrolidone, n-butyl acetate. Suitable hardening agents (20 to 80 wt % of composition) include, not but limited to: 4,4_diaminodiphenolsulfone, 3,3-diaminodiphenylsulfone and methylene dianiline.

Other suitable coupling agents (0.1 to 10 wt % of composition) include, but not limited to: gamma-glycidoxypropyltrimethoxysilane, gamma-glycidoxymethyltricthoxysilane and N-beta-aminocthyl-gamma-aminopropyltrimethoxysilane.

Other suitable wetting agents (0.1 to 50 wt % of composition) include, but not limited to: alkyl phosphonate, an ethoxylated nonyl phenol phosphonate ester, a alkyl ammonium chloride, trimethylcocoammonium chloride, chloride, trimethyltallowammonium dimethyldicocoammonium chloride, hydroxyalkyl ammonium chloride, bis(2-hydroxyethyl) tallowaminc, bis(2-hydroxyethyl) crucylamine, erucyl methyl bis(2-hydroxyethyl) ammonium chloride, bis (2-hydroxyethyl) coco-amine, cetylpyridinium chloride, N,N,N, trimethyl-1-octadecammonium chloride, 1,3-Bis (trimethylammonium)-2-hydroxy propane, 1,3-Bis(triethylammonium)-2-hydroxy propane, 1,3-Bis(dimethyl, ethylammonium)-2-hydroxy propane, 1,3-Bis(tripropylammonium)-2-hydroxy propane, a fatty amine salt, an ammonium salt, a quaternary ammonium compound, an alkyl pyridinium salt, any derivative thereof, and any combination thereof.

For instance, the coupling agent can be or include viscosity enhancing systems including crosslinked gels and conformance gels. The crosslinked polymer viscosity systems can comprise water with the crosslinked polymeric materials comprising 1 wt %, at the most 30 wt % of the aqueous fluid. Suitable base polymers for crosslinking include naturally occurring polysaccharides which consist of guar gum, derivatized guars, derivatized cellulose, Xanthan gum, Diutan gum, in addition to synthetic polymers which entail polyacrylamides, polyethylene oxides, and polyacrylates. These polymers can be use as "linear gels" in the absence of crosslinkers to achieve some low level viscosity.

For instance, the coupling agent can be or include gel-like liquid compositions, as disclosed in U.S. Pat. No. 6,257,335. Examples of such liquid compositions that can be convert into a gel-like substance, include but are not limited to, curable organic resin compositions, gellable aqueous silicate compositions and polymerizable organic monomer compositions.

Examples of curable organic resins include polyepoxide resins, polyester resins, urea-aldehyde resins, furan resins and urethane resins. Of these, polyepoxide resins are preferred in some embodiment. A variety of reactive diluents can be utilized with the above curable organic resins including, but not limited to, phenols, formaldehydes, furfuryl alcohol, furfural, esters, alcohols and ethers such as butyl glycidyl ether, cresyl glycidyl ether and phenyl glycidyl ether.

The gellable aqueous silicate compositions can include an aqueous alkali metal silicate solution and a temperature activated catalyst for gelling the aqueous alkali metal silicate solution. The aqueous alkali metal silicate solution can include one or more of sodium, potassium, lithium, rubidium or cesium silicate. Sodium silicate is the most preferred silicate compound in some embodiments, and of the many forms in which sodium silicate exists, those having a $Na_2O$ to $SiO_2$ weight ratio in the range of from about 1:2 to about 1:4 are preferred in some embodiments. A specifically preferred aqueous sodium silicate solution in some embodiments has a $Na_2O$ to $SiO_2$ weight ratio of about 1:3.22.

The polymerizable organic monomer compositions can be comprised of water, a water soluble polymerizable organic monomer, an oxygen scavenger and a polymerization initiator. A variety of water soluble polymerizable organic monomers can be utilized in the polymerizable compositions. Examples of such monomers include, but are not limited to, acrylic acid, methacrylic acid, acrylamide, methacrylamide, 2-methacrylamido-2-methylpropane sulfonic acid, 2-dimethylacrylamide, vinyl sulfonic acid, N,N-dimethylaminoethylmethacrylate, 2-triethylammoniummethylmethacrylate chloride, N,N-dimethylaminopropylmethacryl-amide, methacrylamidopropyltriethylammonium chloride, N-vinyl pyrrolidone, vinylphosphonic acid and methacryloyloxyethyl trimethylammonium sulfate and mixtures thereof. More preferred polymerizable monomers which are self-crosslinking include hydroxyethylacrylate, hydroxymethylacrylate, hydroxyethylmethacrylate, N-hydroxymethylacrylamide, N-hydroxymethylmethacrylamide, polyethylene glycol acrylate, polyethylene glycol methacrylate, polypropylene glycol acrylate, polypropylene glycol methacrylate and mixtures thereof. Of these, hydroxyethylacrylate is most preferred in some embodiments. A particularly preferred polymerizable monomer in some embodiments, is hydroxyethylcellulose-vinyl phosphoric acid.

A variety of gelling agents can include hydratable polymers which contain one or more of functional groups such as hydroxyl, cis-hydroxyl, carboxyl, sulfate, sulfonate, amino or amide. Particularly useful such polymers are polysaccharides and derivatives thereof which contain one or more of the monosaccharide units galactose, mannose, glucoside, glucose, xylose, arabinose, fructose, glucuronic acid or pyranosyl sulfate. Natural hydratible polymers including the foregoing functional groups and units include guar gum and derivatives thereof, locust bean gum, tara, konjak, tamarind, starch, cellulose and derivatives thereof, karaya, xanthan, tragacanth and carrageenan. Hydratable synthetic polymers and copolymers which contain the above mentioned functional groups and which have been utilized heretofore include polyacrylate, polymethacrylate, polyacrylamide, maleic anhydride, methylvinyl ether polymers, polyvinyl alcohol and polyvinylpyrrolidone. The viscosities of aqueous polymer solutions of the types described above can be increased by combining crosslinking agents with the polymer solutions. Examples of crosslinking agents include multivalent metal salts or compounds which are capable of releasing the metal ions in an aqueous solution. Examples of such multivalent metal ions are chromium, zirconium, antimony, titanium, iron (ferrous or ferric), zinc, aluminum and borates.

For instance, the coupling agent can be or include fluid loss control agent such as K-MAX™ or MAX-SEAL™ pliable crosslinked hydroxyethylcellulose (HEC) gel compositions, as disclosed in U.S. Pat. Nos. 5,304,620 and & 5,439,057. A coupling agent can be prepared from graft copolymers of hydroxyethyl or hydroxypropyl cellulose, prepared by a redox reaction with vinyl phosphonic acid monomers or polymers and hydroxyethyl or hydroxypropyl cellulose which is crosslinked by the addition of a Lewis base or Bronsted-Lowry base or mixture of such bases to an aqueous solution of the graft copolymer. Certain graft copolymers of guar and hydroxypropylguar prepared by a redox reaction with vinyl phosphonic acid monomers or polymers also may be crosslinked and utilized in a suitable manner. Crosslinking activator comprises at least one member selected from the group of magnesium oxide, mono, di or trialkanol amines, calcium oxide, sodium hydroxide, potassium hydroxide, ammonia, cocoamines, pentamines, alkyldiethanol amines, an admixture of boric acid and borate salts and diethylamine.

The coupling agent can include foamable compounds which will fill the void space in the casing and push the fiber against the wall 120 of the casing.

The coupling agent can include Equiseal™, H2Zero®, or Foam2Zero™. Equiseal is a conformance gel previously used in horizontal wellbores. It is a sealant. It will not slump compared to typical sealants. Equiseal contains dilatant gelling agent along with the sealant/crosslinker.

H2Zero® service can be foamed to decrease the density of the H2Zero service fluid. Foaming requires the addition of a foaming agent (HC-2 agent) and viscosifier (FDP-S1076-12 additive). Foam2Zero service retains the same sealant properties as regular H2Zero service in the similar temperature range (40 to 350° F.) and with similar controllable gelation times.

In some embodiments, the coupling agent 110 can include a solid material to facilitate data transmission via the fiber 60 (e.g., transmit strain vibration P-waves and or S-waves) between the casing wall 120 to the fiber 60). For instance, the solid material can include electroconductive particulates such as nano-particles of metal solids, graphene, and the like. For instance, the solid material can be mixed with the coupling agent to provide a slurry in the reservoir 105 which can be pumped into the fluid path 32 via the fluid displacement device 10, such as disclosed herein.

One skilled in the pertinent arts would appreciate how fiber optic sensing via the optical fiber 60 can be used for a formation-sensing operation (step 540).

A distributed optical fiber may be used with OTDR and/or OFDR based Distributed Fiber Optic Sensing systems. Other types of fiber optic sensors may include point sensors either at the surface and/or down-hole.

Fiber optic sensing systems may operate using various sensing principles like Rayleigh scattering, Brillouin scattering, Raman scattering including but not limited to amplitude based sensing systems like e.g. DTS systems based on Raman scattering, phase sensing based systems like e.g. DAS systems based on interferometric sensing using e.g. homodyne or heterodyne techniques where the system may sense phase or intensity changes due to constructive or destructive interference, strain sensing systems like DSS using dynamic strain measurements based on interferometric sensors or static strain sensing measurements using e.g. Brillouin scattering, quasi-distributed sensors based on e.g. Fiber Bragg Gratings (FBGs) where a wavelength shift is detected or multiple FBGs are used to form Fabry-Perot type interferometric sensors for phase or intensity based sensing, or single point fiber optic sensors based on Fabry-Perot or FBG or intensity based sensors.

True Distributed Fiber Optic Sensing (DFOS) systems may operate based on e.g. Optical Time Domain Reflectometry (OTDR) principles or Optical Frequency Domain Reflectometry (OFDR). OTDR based systems are pulsed where one or more optical pulses may be transmitted down an optical fiber and backscattered light (Rayleigh, Brillouin, Raman etc.) is measured and processed. Time of flight for the optical pulse(s) indicate where along the optical fiber the measurement is done. OFDR based systems operate in continuous wave (CW) mode where a tunable laser is swept across a wavelength range, and the back scattered light is collected and processed.

Various hybrid approached where single point or quasi-distributed or distributed fiber optic sensors are mixed with e.g. electrical sensors are also anticipated. The fiber optic cable may then include optical fiber and electrical conductors. Electrical sensors may be pressure sensors based on quarts type sensors or strain gauge based sensors or other commonly used sensing technologies. Pressure sensors, optical or electrical, may be housed in dedicated gauge mandrels or attached outside the casing in various configurations for down-hole deployment or deployed conventionally at the surface well head or flow lines.

Temperature measurements from e.g. a DTS system may be used to determine locations for water injection applications where fluid inflow in the treatment well as the fluids from the surface is likely to be cooler than formation temperatures. It is known in the industry to use DTS warm-back analyses to determine fluid volume placement, this is often done for water injection wells and the same technique can be used for fracturing fluid placement. Temperature measurements in observation wells can be used to determine fluid communication between the treatment well and observation well, or to determine formation fluid movement.

DAS data can be used to determine fluid allocation in real-time as acoustic noise is generated when fluid flows through the casing and in through perforations into the formation. Phase and intensity based interferometric sensing systems are sensitive to temperature and mechanical as well as acoustically induced vibrations. DAS data can be converted from time series date to frequency domain data using Fast Fourier Transforms (FFT) and other transforms like wavelet transforms may also be used to generate different representations of the data. Various frequency ranges can be used for different purposes and where e.g. low frequency signal changes may be attributed to formation strain changes or temperature changes due to fluid movement and other frequency ranges may be indicative if fluid or gas movement. Various filtering techniques and models may be applied to generate indicators of events than may be of interest. Indicators may include formation movement due to growing natural fractures, formation stress changes during the fracturing operations and this effect may also be called stress shadowing, fluid seepage during the fracturing operation as formation movement may force fluid into and observation well and this may be detected, fluid flow from fractures, fluid and proppant flow from frac hits. Each indicator may have a characteristic signature in terms of frequency content and/or amplitude and/or time dependent behavior, and these indicators may be. These indicators may also be present at other data types and not limited to DAS data. Fiber optic cables used with DAS systems may include enhanced back scatter optical fibers where the Rayleigh backscatter may be increased by 10× or more with associated increase in Optical Signal to Noise Ratio (OSNR).

DAS systems can also be used to detect various seismic events where stress fields and/or growing fracture networks generate microseimic events or where perforation charge events may be used to determine travel time between horizontal wells and this information can be used from stage to stage to determine changes in travel time as the formation is fractured and filled with fluid and proppant. The DAS systems may also be used with surface seismic sources to generate Vertical Seismic Profiles (VSPs) before, during and after a fracturing job to determine the effectiveness of the fracturing job as well as determine production effectiveness. VSPs and reflection seismic surveys may be used over the life of a well and/or reservoir to track production related depletion and/or track e.g. water/gas/polymer flood fronts.

DSS data can be generated using various approaches and static strain data can be used to determine absolute strain changes over time. Static strain data is often measured using Brillouin based systems or quasi-distributed strain data from FBG based system. Static strain may also be used to determine propped fracture volume by looking at deviations in strain data from a measured strain baseline before fracturing a stage. It may also be possible to determine formation properties like permeability, poroelastic responses and leak off rates based on the change of strain vs time and the rate at which the strain changes over time. Dynamic strain data can be used in real-time to detect fracture growth through an appropriate inversion model, and appropriate actions like dynamic changes to fluid flow rates in the treatment well, addition of diverters or chemicals into the fracturing fluid or changes to proppant concentrations or types can then be used to mitigate detrimental effects.

Fiber Bragg Grating based systems may also be used for a number of different measurements. FBG's are partial reflectors that can be used as temperature and strain sensors, or can be used to make various interferometric sensors with very high sensitivity. FBG's can be used to make point sensors or quasi-distributed sensors where these FBG based sensors can be used independently or with other types of fiber optic based sensors. FBG's can manufactured into an optical fiber at a specific wavelength, and other system like DAS, DSS or DTS systems may operate at different wavelengths in the same fiber and measure different parameters simultaneously as the FBG based systems using Wavelength Division Multiplexing (WDM) and/or Time Division Multiplexing (TDM).

The sensors can be placed in either the treatment well or monitoring well(s) to measure well communication. The treatment well pressure, rate, proppant concentration, diverters, fluids and chemicals may be altered to change the hydraulic fracturing treatment. These changes may impact the formation responses in several different ways, e.g.: stress fields may change, and this may generate microseismic effects that can be measured with DAS systems and/or single point seismic sensors like geophones; fracture growth rates may change and this can generate changes in measured microseismic events and event distributions over time, or changes in measured strain using the low frequency portion or the DAS signal or Brillouin based sensing systems; pressure changes due to poroelastic effects may be measured in the monitoring well; pressure data may be measured in the treatment well and correlated to formation responses; various changes in treatment rates and pressure may generate events that can be correlated to fracture growth rates.

Several measurements can be combined to determine adjacent well communication, and this information can be used to change the hydraulic fracturing treatment schedule to generate desired outcomes. Multiple wells in a field and/or reservoir may be instrumented with optical fibers for monitoring subsurface reservoirs from cradle to grave. Subsurface applications may include hydrocarbon extraction, geothermal energy production and/or fluid injection like water or $CO_2$ in carbon capture, utilization and storage (CCUS) applications.

Each of the foregoing embodiments may include one or more of the following elements singly or in combination, and neither the example embodiments or the following listed elements limit the disclosure, but are provided as examples of the various embodiments covered by the disclosure:

Element 1: A coupling agent for deployment around an optical fiber in a subsurface wellbore, the coupling agent comprising a curable or non-curable compound that can form into a reversible polymerized gel state located around at least a portion of the optical fiber and there is a gel-optical fiber interface strain gradient that is greater than a wellbore fluid-optical fiber strain gradient.

Element 2: the gel-optical fiber interface strain gradient is at least 166 percent greater than the wellbore fluid-optical fiber strain gradient.

Element 3: the non-curable compound includes a polyacrylate.

Element 4: the non-curable compound includes a polyamide.

Element 5: the curable compound further includes a curable polymetric resin.

Element 6: the curable polymeric resins include an epoxy resin.

Element 7: the curable compound further includes one or more of a solvent, a hardening agent, a coupling agent, or a wetting agent.

Element 8: the non-curable compound includes a polymerizable organic monomer.

Element 9: the non-curable compound further includes a delinking agent.

Element 10: the non-curable compound includes a gelling agent that includes hydratable polymers.

Element 11: the non-curable compound includes a fluid loss control agent.

Element 12: the non-curable compound includes a foamable compounds.

Element 13: the coupling agent is part of a formation testing apparatus.

Element 14: the formation testing apparatus includes the optical fiber and a fiber conveyor.

Element 15: the optical fiber and the fiber conveyor are disposable.

Element 16: the formation testing apparatus includes one or more of a fluid displacement device, a reservoir that includes the coupling agent or a waveguide-based distributed sensing module.

Element 17: A method, comprising: deploying an optical fiber in a fluid path of a subsurface wellbore and introducing a coupling agent in the fluid path, wherein the coupling agent includes a curable or non-curable compound that can form into a reversible polymerized gel state, the curable or non-curable compound is located around at least a portion of the optical fiber and there is a gel-optical fiber interface strain gradient that is greater than a wellbore fluid-optical fiber strain gradient.

Element 18: the coupling agent is introduced during or after the deploying of the optical fiber.

Element 19: pumping a pig through the fluid path during or after the introducing of the coupling agent.

Element 20: conducting a formation-sensing operation through the optical fiber when the coupling agent is in the polymerized gel state.

The foregoing listed embodiments and elements do not limit the disclosure to just those listed above, and those skilled in the art to which this application relates will appreciate that other and further additions, deletions, substitutions and modifications may be made to the described embodiments.

What is claimed is:

1. A coupling agent for deployment around an optical fiber in a subsurface wellbore, the coupling agent comprising:
    a curable or non-curable compound that can form into a reversible polymerized gel state located around at least a portion of the optical fiber and there is a gel-optical fiber interface strain gradient that is greater than a wellbore fluid-optical fiber strain gradient.

2. The coupling agent of claim 1, wherein the gel-optical fiber interface strain gradient is at least 166 percent greater than the wellbore fluid-optical fiber strain gradient.

3. The coupling agent of claim 1, wherein the non-curable compound includes a polyacrylate.

4. The coupling agent of claim 1, wherein the non-curable compound includes a polyamide.

5. The coupling agent of claim 4, wherein the curable compound further includes a curable polymetric resin.

6. The coupling agent of claim 5, wherein the curable polymeric resins include an epoxy resin.

7. The coupling agent of claim 5, wherein the curable compound further includes one or more of a solvent, a hardening agent, a coupling agent, or a wetting agent.

8. The coupling agent of claim 1, wherein the non-curable compound includes a polymerizable organic monomer.

9. The coupling agent of claim 8, wherein the non-curable compound further includes a delinking agent.

10. The coupling agent of claim 1, wherein the non-curable compound includes a gelling agent that includes hydratable polymers.

11. The coupling agent of claim 1, wherein the non-curable compound includes a fluid loss control agent.

12. The coupling agent of claim 1, wherein the non-curable compound includes a foamable compounds.

13. The coupling agent of claim 1, wherein the coupling agent is part of a formation testing apparatus.

14. The coupling agent of claim 13, wherein the formation testing apparatus includes the optical fiber and a fiber conveyor.

15. The coupling agent of claim 14, wherein the optical fiber and the fiber conveyor are disposable.

16. The coupling agent of claim 13, wherein the formation testing apparatus includes one or more of a fluid displacement device, a reservoir that includes the coupling agent or a waveguide-based distributed sensing module.

17. A method, comprising:
    deploying an optical fiber in a fluid path of a subsurface wellbore; and
    introducing a coupling agent in the fluid path, wherein the coupling agent includes a curable or non-curable compound that can form into a reversible polymerized gel state, the curable or non-curable compound is located around at least a portion of the optical fiber and there is a gel-optical fiber interface strain gradient that is greater than a wellbore fluid-optical fiber strain gradient.

18. The method of claim 17, wherein the coupling agent is introduced during or after the deploying of the optical fiber.

19. The method of claim 17, including pumping a pig through the fluid path during or after the introducing of the coupling agent.

20. The method of claim 17, further including conducting a formation-sensing operation through the optical fiber when the coupling agent is in the polymerized gel state.

* * * * *